United States Patent
Brin

(10) Patent No.: US 10,210,030 B2
(45) Date of Patent: Feb. 19, 2019

(54) SECURELY OPERATING REMOTE CLOUD-BASED APPLICATIONS

(71) Applicant: CyberArk Software Ltd., Petach-Tikva (IL)

(72) Inventor: Max Brin, Rosh Ha Ayin (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

(21) Appl. No.: 15/649,357

(22) Filed: Jul. 13, 2017

(65) Prior Publication Data

US 2019/0018719 A1    Jan. 17, 2019

(51) Int. Cl.
| | |
|---|---|
| *G06F 9/54* | (2006.01) |
| *H04L 29/06* | (2006.01) |
| *H04L 29/08* | (2006.01) |
| *H04W 4/02* | (2018.01) |
| *G06F 9/451* | (2018.01) |

(52) U.S. Cl.
CPC .............. *G06F 9/547* (2013.01); *H04L 63/10* (2013.01); *G06F 9/452* (2018.02); *H04L 63/20* (2013.01); *H04L 67/10* (2013.01); *H04W 4/02* (2013.01)

(58) Field of Classification Search
None
See application file for complete search history.

(56) References Cited

U.S. PATENT DOCUMENTS

| | | | | |
|---|---|---|---|---|
| 2008/0263219 | A1* | 10/2008 | Bacchi | H04L 29/06027 709/231 |
| 2009/0254982 | A1* | 10/2009 | Jansen | G06F 21/41 726/8 |
| 2013/0091557 | A1* | 4/2013 | Gurrapu | G06F 21/53 726/5 |

(Continued)

FOREIGN PATENT DOCUMENTS

EP    2 728 506 A1    5/2014

OTHER PUBLICATIONS

Extended European Search Report re Application No. EP 17 18 5201.5 dated Feb. 8, 2018.

*Primary Examiner* — Umut Onat
(74) *Attorney, Agent, or Firm* — Finnegan, Henderson, Farabow, Garrett & Dunner LLP

(57) ABSTRACT

Systems and methods may provide network-based application functionality to a remote mobile computing device. A method includes establishing, in response to a request, a remote session connection with the remote mobile computing device via an application container client at the remote mobile computing device, and accessing a virtual application process, based on a particular configuration of the remote mobile computing device, for a mobile application. The method also includes transmitting to the remote mobile computing device, via the remote session connection, content for presenting an interface of the mobile application according to the virtual application process, the content being configured for rendering by the application container (Continued)

client at the remote mobile computing device to simulate an interface associated with the mobile application according to the particular configuration of the remote mobile computing device, wherein the mobile application is not stored on the remote mobile computing device.

27 Claims, 7 Drawing Sheets

(56) References Cited

U.S. PATENT DOCUMENTS

| | | | |
|---|---|---|---|
| 2014/0122875 A1* | 5/2014 | Pizi | G06F 21/33 |
| | | | 713/164 |
| 2015/0081764 A1 | 3/2015 | Zhao et al. | |
| 2017/0034578 A1* | 2/2017 | Patel | H04N 21/454 |

* cited by examiner

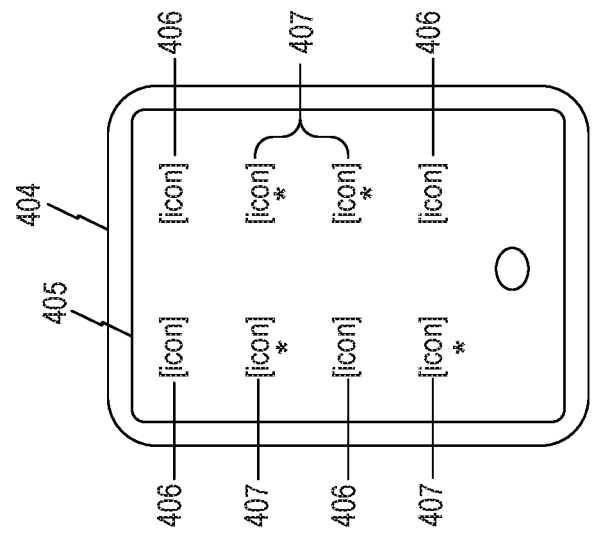
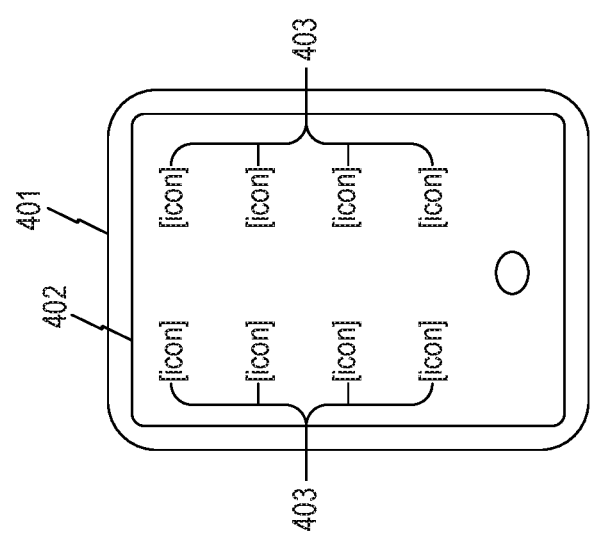
FIG. 4

SECURELY OPERATING REMOTE CLOUD-BASED APPLICATIONS

BACKGROUND

With the ever-growing popularity and versatility of mobile devices (e.g., smartphones, tablets, and more), mobile devices are no longer only used for a single purpose, such as business or personal use. Mobile devices are widely used in both ways by individual users and often include native applications (e.g., stored on the mobile device) that extend desktop application and web application functionality to the mobile device suitable for access and interaction via the mobile device. What this means is that mobile devices often include both enterprise or business-focused applications (e.g., database, web development, and financial applications) and personal use applications (e.g., social networking, gaming, and entertainment applications). Moreover, sometimes the same application (e.g., Facebook™ or Twitter™) will have both a business account and a personal account on a given mobile device.

The rise in popularity of mobile devices, and the multiple uses of such devices, has also led to an increase in security threats for mobile devices. Sensitive business and personal data is often stored on, or accessible via, mobile devices. Attempts to improperly access or use this data have been on the rise. Moreover, because many modern businesses integrate mobile enterprise applications with their internal corporate networks, or their cloud computing networks, improper access to a mobile device can lead to significant threats to an organization's sensitive data. In these situations, where the sensitive data being accessed may be stored remote from the mobile device, the mobile application itself that is being used to access the sensitive data is native, e.g. stored and run on the mobile device, thus making the mobile device itself a vulnerability.

Attacks may arise from features of mobile devices that are common to all computer-based equipment, such as credential theft, phishing, keystroke logging, etc. But many attacks focus on features unique to mobile devices, such as SMS and MMS messaging, mobile WiFi capabilities, local mesh networking, mobile-based social network features, geographic location-based features, and cellular capabilities. Further attacks exploit features of mobile device web browsers and operating systems, which differ from desktop and laptop browsers and operating systems.

Some technologies currently make enterprise or other web applications accessible remotely (e.g., outside of a proprietary network) to desktop users. These remote access techniques allow users to connect to a remote computer and provide a virtual or remote desktop to the user. For some technologies, instead of presenting remote application functionality to the user in the desktop of the Remote Desktop Session Host server, a remote access program may be integrated with the client's desktop. Nevertheless, technologies of this type involve remote connections and interaction with a computer system (typically a PC), where operating system fragmentation and configuration changes, proprietary software and firmware, and software and firmware updates and changes work seamlessly in heterogeneous (i.e., stable and known) environments and platforms. In these environments and platforms, technical challenges that arise in a mobile device environment, such as network connectivity (e.g., Internet or cellular connectivity) and capability (e.g., performance, transmission rates, bandwidth, latency, etc.) are not usually problematic issues. In a mobile device environment, where mobile devices may have limited cellular and WiFi connections, and connections may experience significant latency, these issues can be critical, and thus remote desktop functionality may not be practicable in some mobile device environments.

Thus, there is a need for technological solutions for securely providing mobile device users with access to enterprise applications or other mobile applications used for creating or accessing business information or otherwise sensitive information. As mobile device users increasingly need to access sensitive data stored on corporate networks, or in cloud networks, access to this data should be controlled so that improper access to a mobile device does not compromise such sensitive data. These solutions should further account for the unique characteristics of the mobile device environment, and present minimal degradation to the user experience (e.g., changes in latency, visual displays, etc.). Further, it would be advantageous to enable organizations to control and audit use of mobile devices that access their sensitive data or other network resources.

SUMMARY

The disclosed embodiments describe systems and methods for providing network-based application functionality to a remote mobile computing device.

A disclosed embodiment includes a server system for providing network-based application functionality to a remote mobile computing device. The system may comprise a memory device storing a set of instructions and a processor configured to execute the set of instructions. When executed, the instructions may receive, from an application container client at the remote mobile computing device, a request to initiate a remote session connection, establish, in response to the request, a remote session connection with the remote mobile computing device via the application container client, access a virtual application process for a mobile application based on an identifier of the mobile application received from the remote mobile computing device, wherein the virtual application process is based on a particular configuration of the remote mobile computing device, and transmit to the remote mobile computing device, via the remote session connection, content for presenting an interface of the application according to the virtual application process, the content being configured for rendering by the application container client at the remote mobile computing device to simulate an interface associated with the mobile application according to the particular configuration of the remote mobile computing device, wherein the mobile application is not stored on the remote mobile computing device.

According to a disclosed embodiment, the processor is further configured to determine the particular configuration of the remote mobile computing device based on specification information associated with the remote mobile computing device.

According to a disclosed embodiment, the specification information includes information indicative of one or more settings of an operating system associated with the remote mobile computing device.

According to a disclosed embodiment, the specification information includes information indicative of at least one of a user-specific setting of the remote mobile computing device, a screen resolution of the remote mobile computing device, a language setting for the remote mobile computing device, and one or more parameters effecting visual display characteristics of the remote mobile computing device.

According to a disclosed embodiment, the processor is configured to retrieve the specification information from storage distinct from the remote mobile computing device.

According to a disclosed embodiment, the virtual application process for the mobile application is based on at least one user-specific setting associated with a user's account with the mobile application.

According to a further disclosed embodiment, the received request to initiate the remote session connection includes the specification information.

According to an additional disclosed embodiment, the received request to initiate the remote session connection includes a credential for authenticating a user associated with the remote mobile computing device.

According to a further disclosed embodiment, the remote session connection is established responsive to authenticating the request based on the credential.

According to an additional disclosed embodiment, the received request to initiate the remote session connection includes the identifier of the mobile application.

According to a further disclosed embodiment, the received request to initiate the remote session connection is received via the application container client responsive to a user selection of an icon associated with the mobile application.

According to an additional disclosed embodiment, the mobile application is one of a plurality of third-party applications accessible via the application container client.

According to a further disclosed embodiment, the content is configured for rendering by the application container client at the remote mobile computing device to simulate an interface associated with a native version of the mobile application as if the native mobile application were executed on the mobile computing device.

According to an additional disclosed embodiment, to access the virtual application process, the processor is further configured to launch the virtual application process.

According to a further disclosed embodiment, to access the virtual application process, the processor is further configured to identify a virtual application process, based on the particular configuration of the remote mobile computing device, from among a plurality of active virtual application processes launched prior to receiving the request from the remote mobile computing device.

According to an additional disclosed embodiment, the processor is further configured to control the virtual application process for the mobile application on behalf of the remote mobile computing device.

According to a further disclosed embodiment, the processor is further configured to log a user's interaction with the mobile application via the virtual application process.

According to an additional disclosed embodiment, the processor is further configured to monitor the remote session connection for actions pertaining to the virtual application process initiated at the remote mobile computing device.

According to a further disclosed embodiment, the processor is further configured to transmit a command to the remote mobile computing device instructing the application container client to enable access to a local resource stored on the remote mobile computing device.

According to an additional disclosed embodiment, the processor is configured to transmit the command to the remote mobile computing device via an auxiliary remote session connection, and to receive the local resource from the remote mobile computing device via the auxiliary remote session connection.

A disclosed embodiment may also include a method for providing network-based application functionality to a remote mobile computing device. The method may comprise receiving, from an application container client at the remote mobile computing device, a request to initiate a remote session connection, establishing, in response to the request, a remote session connection with the remote mobile computing device via the application container client, accessing a virtual application process for a mobile application based on an identifier of the mobile application received from the remote mobile computing device, wherein the virtual application process is based on a particular configuration of the remote mobile computing device, and transmitting to the remote mobile computing device, via the remote session connection, content for presenting an interface of the application according to the virtual application process, the content being configured for rendering by the application container client at the remote mobile computing device to simulate an interface associated with the mobile application according to the particular configuration of the remote mobile computing device, wherein the mobile application is not stored on the remote mobile computing device.

A further disclosed embodiment may also include determining the particular configuration of the remote mobile computing device based on specification information associated with the remote mobile computing device.

According to another disclosed embodiment, the specification information includes information indicative of at least one of a user-specific setting of the remote mobile computing device, a screen resolution of the remote mobile computing device, a language setting for the remote mobile computing device, and one or more parameters effecting visual display characteristics of the remote mobile computing device.

According to another disclosed embodiment, the content is configured for rendering by the application container client at the remote mobile computing device to simulate an interface associated with a native version of the mobile application as if the native mobile application were executed on the mobile computing device.

In a further disclosed embodiment, a non-transitory computer readable medium may include a set of instructions executable by a processor of a mobile computing device to perform operations for providing network-based mobile application functionality at the mobile computing device. The operations may comprise initiating a communication session with a remote server system, transmitting, via the communication session, information indicative of a mobile application to be executed via a virtual application process at the remote server system, receiving, via the communication session, content for presenting an interface of the mobile application according to the virtual application process, the content being configured by the virtual application process according to a particular configuration of the mobile computing device, and rendering the received content for display at the mobile computing device, wherein the rendering provides a simulated interface associated with a native version of the mobile application according to the particular configuration of the mobile computing device, wherein the native mobile application is not stored on the mobile computing device.

According to a further disclosed embodiment, the operations further comprise providing specification information indicative of the particular configuration of the mobile computing device, wherein the specification information includes information indicative of one or more settings of an operating system associated with the mobile computing device, and information indicative of at least one of a user-specific setting of the mobile computing device, a screen resolution of the mobile computing device, a language setting for the mobile computing device, and one or more parameters effecting visual display characteristics of the mobile computing device.

According to another disclosed embodiment, the transmitting information indicative of the mobile application is provided as part of a request to initiate the communication session with the remote server system.

According to a further disclosed embodiment, the initiating of the communication session with the remote server system is performed responsive to receiving a user selection of an icon associated with the mobile application.

According to another disclosed embodiment, the mobile application is one of a plurality of third-party applications accessible via the application container client.

According to a further disclosed embodiment, the simulated interface is based on at least one user-specific setting associated with a user's account with the mobile application.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings:

FIG. 4 is an example illustration of mobile device user interfaces with graphical icons, in accordance with disclosed embodiments.

DETAILED DESCRIPTION

Figure 1:
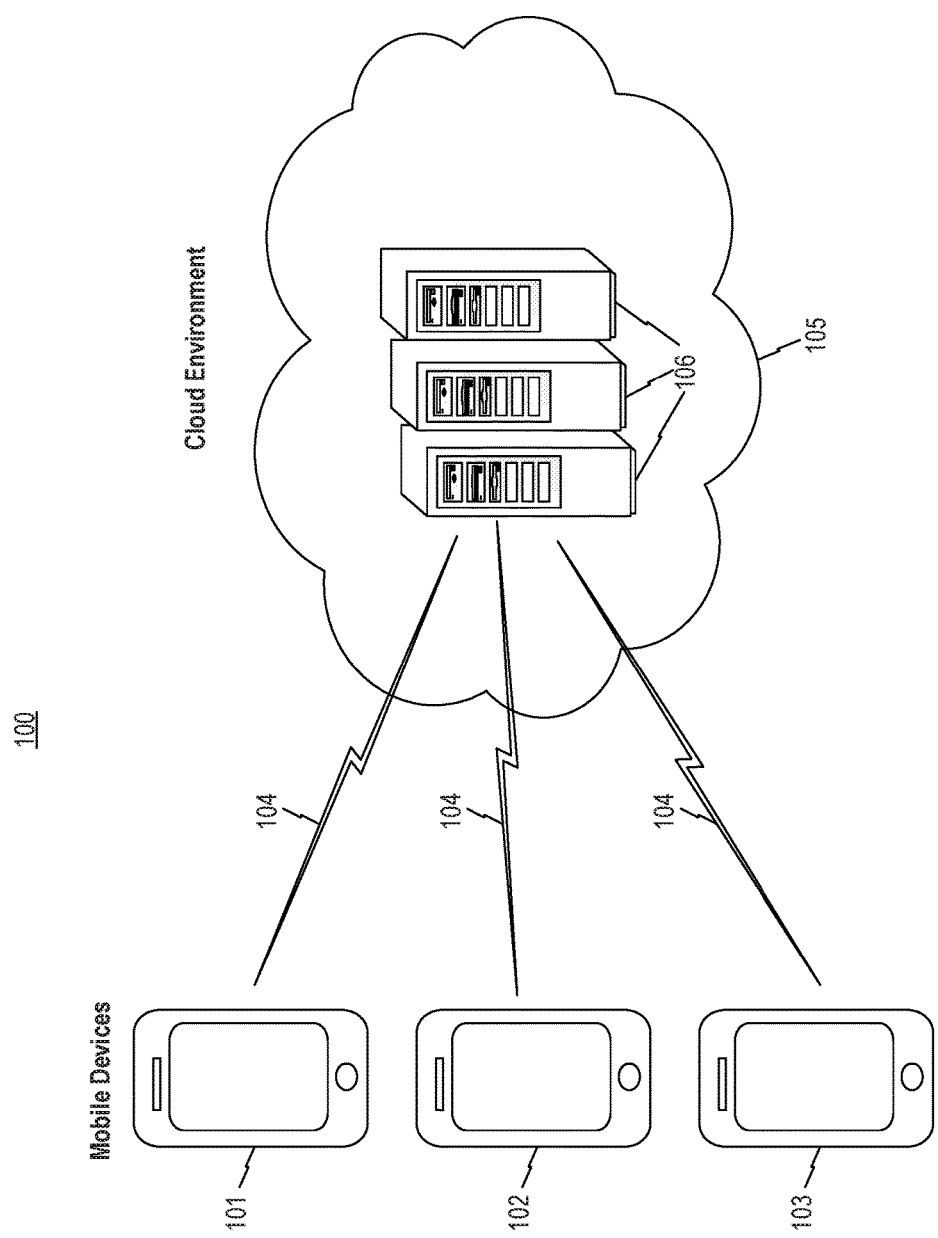
FIG. 1 is a block diagram of an example system, in accordance with disclosed embodiments.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

In the disclosed embodiments, a variety of applications may be installed on a mobile computing device (also called a mobile device). As disclosed herein, the mobile computing device may be a variety of mobile computer-based devices, such as smartphones, feature phones, tablets, personal digital assistants, enterprise digital assistants, smart cards, smart watches, smart bands, smart headphones, computer-embedded clothing, car-computers and other in-vehicle computer equipment, and any other mobile device with computer processing and network connectivity capabilities. The mobile computing device may have a hardware processor, memory storing software (e.g., applications, firmware, operating system, etc.), and a wired or wireless network connectivity interface (e.g., cellular, WiFi, Bluetooth™, radio frequency, USB™ Ethernet, wireless mesh network, or any other standardized or proprietary network communications technology). In some embodiments, the mobile computing device may also have graphics processing and rendering capabilities.

In the disclosed embodiments, an application container client may be installed on a mobile computing device. As disclosed herein, the application container client may be an application on the mobile computing device that is installed for purposes of communicating with a remote server that has application broadcasting and/or authentication functions. In some embodiments, the application container client may be configured for rendering application content on the mobile computing device. As described below, this may involve accessing the native graphics processing and display capabilities on the mobile computing device. Alternatively, it may involve graphics and display capabilities of the application container client itself. In further embodiments, the application container client may also interface with other applications, or application shortcuts, stored on the mobile computing device. As described below, the application container client may handle requests for execution of such applications, and negotiate access to remote versions of the applications on a remote server. In some embodiments, the application container client may be provided by a cybersecurity organization or a business enterprise for managing users' access to applications on their mobile computing device. In certain embodiments, users of mobile devices may be allowed to directly interact with the application container client, for example, to authenticate themselves or to select applications to run via remote connections.

In the disclosed embodiments, a virtual application process may be accessed for a mobile computing device. As disclosed herein, the virtual application process may correspond to an application that may be installed on a mobile computing device, but instead is running on a remote machine. The virtual application process may, for example, run on a virtual machine or as a container in a cloud computing environment, or may run in any other computer virtualization environment. With respect to the Android™ operating system, for example, Android's™ X86 port, Android™ simulators, or Android™ emulators may be used to run virtualized versions of mobile applications. Similar techniques may be applied to other mobile operating systems as well, such as Apple™ operating systems, BlackBerry™ operating systems, Windows Mobile™ operating systems, and more.

As described below, the virtual application process may run in accordance with a particular configuration or specification of a mobile computing device. The configuration or specification may be based on various features of the mobile computing device, such as its operating system type, operating system version, software or firmware upgrade status, screen resolution, network connection speed, theme, visual appearance, language, application settings, permissions, memory contents, other stored applications, personal information, email address, telephone number, IP address, MAC address, device identification number, or any other characteristics of a mobile device or data stored thereon. As described further below, the virtual application process may be run remotely from the mobile computing device so that it can be transmitted or broadcast to the remote mobile computing device.

The disclosed embodiments also include establishing a remote session connection between a mobile computing device and a remote server. As described further below, the remote session connection may be a secure connection that enables an application process running at the remote server (or in communication with the remote server) to be broadcasted, streamed, or otherwise transmitted to the mobile computing device. The remote session connection enables the mobile computing device to simulate the application process running on the mobile computing device without actually requiring that a corresponding application be installed on the mobile computing device. The remote session connection may utilize a variety of remote connection technologies, such as "what-you-see-is-what-you-get" (WYSIWYG) streaming, textual representations of GUI components, Microsoft's Remote Desktop™ VNC™, or proprietary remote streaming or transmission protocols. Further, the remote session connection may be secured (e.g., via SSL, TLS, SRTP, etc.). In some embodiments, the remote session connection may support recording or auditing by an enterprise or cloud system provider. Using such features, when a mobile device establishes a connection with a remote server, the enterprise or cloud system provider can monitor, record, and audit (e.g., in the form of keystrokes, screenshots, connection logs, file transfer logs, etc.) the activity of the mobile device when participating in the remote session connection.

In various embodiments, a mobile computing device may undergo authentication of itself, or a user associated with it, before it can obtain access to a remotely executing mobile application. As discussed herein, authentication may broadly take several forms, such as verification of passwords, SSH keys, symmetric (e.g., public/private) keys, Kerberos tickets, Docker signed tags, and other types of cryptographic data or privileged access tokens. Further, the authentication may be based on biometric or behavioral information, such as fingerprints, retinal scans, x-rays, biosensors, voice recognition, body movements, walking pace or rhythm, sitting characteristics or patterns, key stroke analysis, and more. In accordance with the disclosed embodiments, the authentication may be single-factor or multi-factor (i.e., a combination of any of the foregoing forms of authentication). Further, as discussed below, the authentication may be performed on the mobile computing device, on a remote server, or through a combination of functionality of both.

Reference will now be made in detail to the disclosed embodiments, examples of which are illustrated in the accompanying drawings.

FIG. 1 is a block diagram of an example system 100 in accordance with disclosed embodiments. The system includes a plurality of mobile devices 101-103 that may communicate via one or more networking technologies with one or more servers 106 in a cloud environment 105. As described above, the mobile devices 101-103 may represent various different types of mobile computer-based devices, such as smartphones, feature phones, tablets, personal digital assistants, enterprise digital assistants, smart cards, smart watches, smart bands, smart headphones, computer-embedded clothing, car-computers and other in-vehicle computer equipment, and any other mobile device with computer processing and network connectivity capabilities. The mobile devices 101-103 may include software, such as an operating system, firmware, graphics software, applications, and an application container client, as discussed further below.

As shown in FIG. 1, mobile devices 101-103 are configured for communication (direct or indirect) with server 106 in network 105 via network communications path 104. The network communications path 104 may be one, or a combination, of wired or wireless network connectivity technologies, such as cellular, WiFi, Bluetooth™, radio frequency, USB™, Ethernet, wireless mesh networking, or any other standardized or proprietary network communications technology. In order to communicate with server 106 using these communications technologies, mobile devices may have an integrated or external network communications interface, which is designed to support such communications. Likewise, server 106 may have a corresponding (or different) network communications interface for communicating with mobile devices 101-103.

Server 106 may be one or more of various types of servers, whether a single server machine, a group of common server machines, or a server farm. As discussed further below, server 106 may be configured to perform various functions with mobile devices 101-103, such as authentication of the mobile devices 101-103 or users thereof, and transmission or broadcasting of mobile application content to mobile devices 101-103. In various embodiments, server 106 may communicate with one or more other servers in network 105, or in other networks, to perform such authentication and transmission or broadcasting functionality. Depending on the embodiment, server 106 may include appropriate load-balancing support, so as to manage potentially changing volumes of data traffic with mobile devices 101-103.

Network 105 may be a cloud network, as depicted in FIG. 1, or may be an enterprise's own network. As discussed further below, network 105 may contain, or may access from another network, a plurality of virtual machines and/or containers running on machines. In accordance with embodiments discussed herein, these virtual machines and/or containers may be configured to run versions of mobile applications that can be transmitted or broadcasted to mobile devices without requiring that the mobile applications actually be stored and run on the mobile devices.

Figure 2:
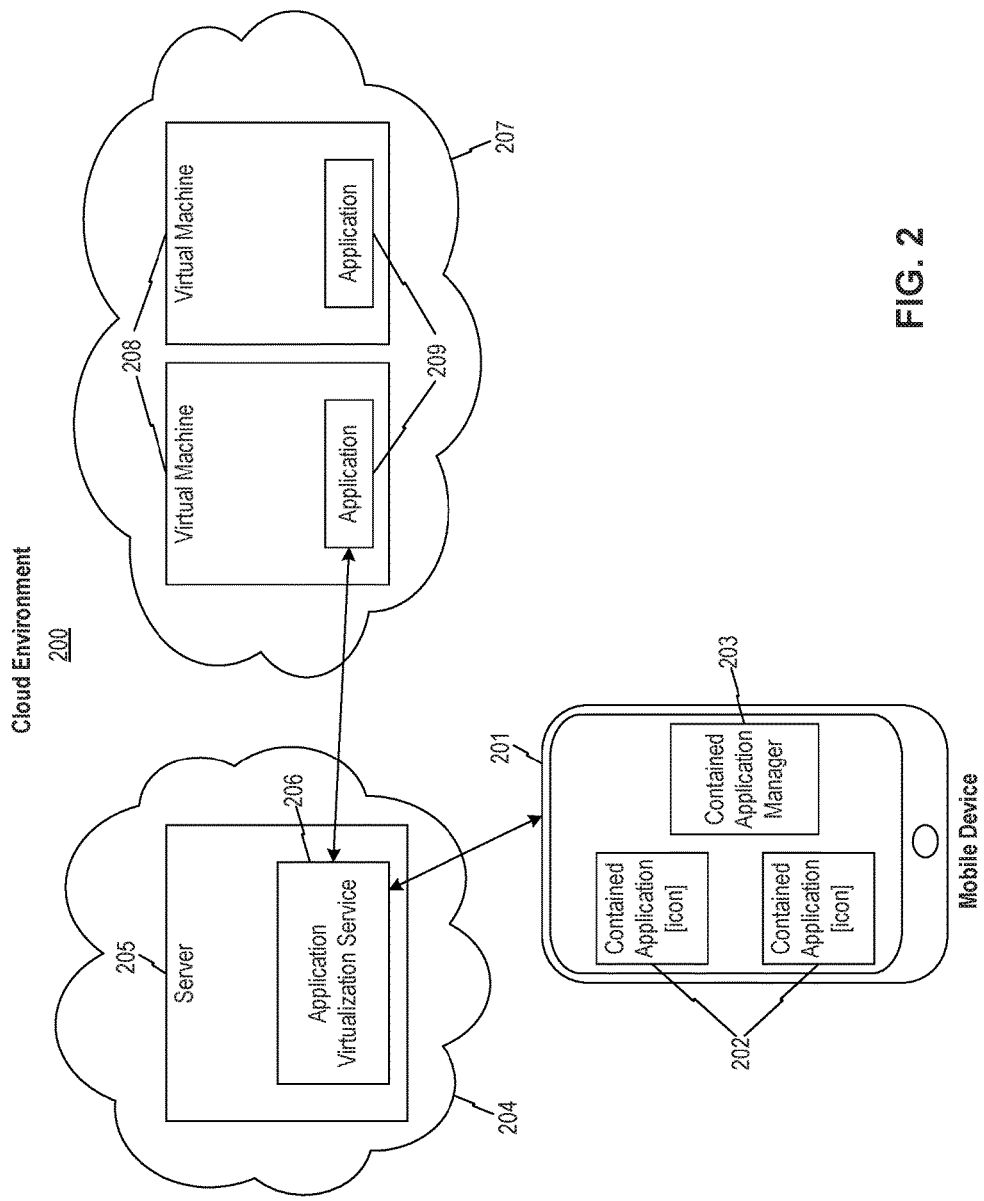
FIG. 2 is a block diagram of another example system, in accordance with disclosed embodiments.

FIG. 2 is a block diagram of another example system 200 in accordance with disclosed embodiments. System 200 includes a mobile device 201, which may be similar to mobile devices 101-103 described above. Mobile device 201 may include a plurality of contained applications 202, which may be represented on a user interface of mobile device 201 as graphical icons (as shown in FIG. 2) or in any other manner. Contained applications 202 may be any type of mobile application that can be run on mobile device 201 and/or on a remote server and transmitted to mobile device 201. Examples of contained applications 202 are business-use applications (e.g., database, payroll, human resources, or email applications) and personal-use applications (e.g., social media, entertainment, or gaming applications).

As discussed further below, in accordance with disclosed embodiments, certain contained applications 202 may be native applications stored and executed on mobile device 202 while other contained applications 202 may not execute at all on mobile device 202. For such latter contained applications 202, the application may run on a remote server and be transmitted or broadcast to mobile device 201 via contained application manager 203. Contained application manager 203 may be an application installed on the mobile device 201 with functions of authentication and intermediating access to mobile applications running remotely from mobile device 201. As discussed further below, contained application manager 203 may facilitate authentication of mobile device 201, or a user thereof, and then obtain via a connection with a remote server a streaming or broadcasted version of a mobile application running remotely. In embodiments where contained applications 202 are not running locally on mobile device 201, mobile device 201 may nonetheless display icons or shortcuts corresponding to the contained applications 202. When a user of mobile device 201 selects one of the contained applications 202, contained application manager 203 may then negotiate access to a remotely running version of the selected contained application 202.

System 200 also includes a cloud environment, depicted generally as network 204 and network 207. In various embodiments, networks 204 and 207 may be the same on-premises network of an enterprise, a combination of on-premises networks and cloud networks, or entirely cloud-based networks. Networks 204 and 207 may be the same network, or physically or geographically separated networks. In embodiments where networks 204 and 207 are cloud-based networks, the networks 204 and 207 may be private cloud networks, public cloud networks, or a combination of both. Examples of cloud networks include those offered by Microsoft Azure™, Hewlett Packard Enterprise Rapid Infrastructure Provisioning™, IBM Bluemix™, Amazon Web Services™, and others. Networks 204 and 207 may be deployed in one or more service configurations, such as IaaS (Infrastructure-as-a-Service or Information-as-a-Service), PaaS (Platform-as-a-Service or Process-as-a-Service), SaaS (Software-as-a-Service or Storage-as-a-Service), DaaS (Database-as-a-Service), AaaS (Application-as-a-Service), etc.

As illustrated in FIG. 2, network 204 may include an application virtualization service 206, which is responsible for managing a plurality of virtualized applications that may be transmitted or broadcasted to mobile devices (e.g., mobile device 201). For example, application virtualization service 206 may function to spin up new virtual machines, or new containers, that run mobile applications corresponding to contained applications 202 on mobile device 201. Application virtualization service 206 may spin up such virtual machines or containers based on requests or notifications from contained application manager 203, or on its own initiative. In some embodiments, application virtualization service 206 manages a plurality of virtual machines or containers that are running pre-loaded versions of applications, so that when a mobile device (e.g., mobile device 201) requests such an application, it may be transmitted or broadcasted to the mobile device with a minimum of latency.

The virtual machines or containers that are managed by application virtualization service 206 are depicted as virtual machines 208 in network 207. As shown in FIG. 2, each virtual machine or container 208 may run one or more applications 209, which correspond to mobile applications that can be transmitted or broadcasted to mobile device 201. Applications 209 may correspond to user enterprise-specific mobile applications or other mobile applications configured for accessing enterprise resources or any of generally accessible third party mobile applications. In various embodiments, applications 209 may be streamed directly to mobile device 201 via virtual machines or containers 208, or may be transmitted through application virtualization service 206 to mobile device 201. As discussed further below, applications 209 may be configured and executed in accordance with various characteristics of mobile device 201, such as mobile device 201's operating system, language, screen resolution, software or firmware updates, application settings, etc. In some embodiments, applications 209 may be configured and executed in accordance with additional user-specific application characteristics, such as characteristics or settings associated with a user's account with an application. Such characteristics may include any user-configurable settings associated with functionality within an account, distinct from any mobile device configurations or settings.

In some embodiments, each virtual machine or container 208 may run one or more applications 209, such that to a remote server it may appear to be running on behalf of a particular user. For example, an application 209 may be run by a virtual machine or container 208 to interface with a third party server associated with the application using a user's credentials to interact with and perform functionality with a third party service provider on behalf of a user. In other words, instead of a user interacting directly with a third-party service provider via a native application, a user may interact with a virtual application process running on virtual machine or container 208, which is interacting with the third party server as if it were being executed on a user's mobile device. In the disclosed embodiments, functionality provided by the third party server may then be extended to the mobile device via an interface provided by the virtual application process running on virtual machine or container 208, as described in further detail below.

Figure 3:
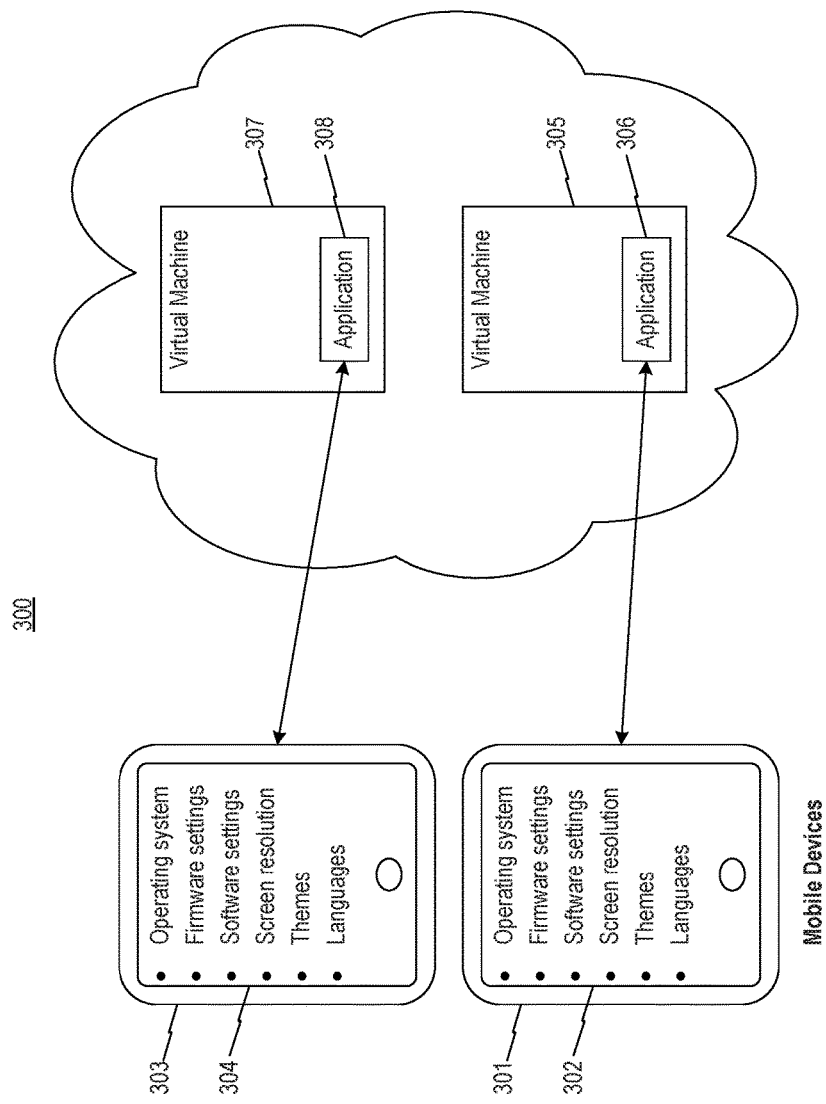
FIG. 3 is an example illustration of potential mobile device configuration data, in accordance with disclosed embodiments.

FIG. 3 is a block diagram of example system 300 in accordance with disclosed embodiments. The system includes potential mobile device configuration data associated with mobile devices 301 and 303, and also associated with virtual machines or containers 305 and 307. The configuration data, shown as data 302 and 304, may be based on various features of the mobile devices 301 and 303, such as their operating system type, operating system version, software or firmware upgrade status, screen resolution, network connection speed, theme, visual appearance, language, application settings, permissions, memory contents, other stored applications, personal information, email address, telephone number, IP address, MAC address, device identification number, or any other characteristics of mobile devices 301 and 303 or data stored thereon.

As illustrated in FIG. 3, virtual machines or containers 305 and 307 may run applications 306 and 308 that are spun up to have the same, or similar, configuration attributes as if the applications were run on mobile devices 301 and 303. In some embodiments, applications 306 and 308 may be spun up based on a request from mobile devices 301 and 303 for access to such applications. In other embodiments, applications 306 and 308 are pre-loaded and pre-executed on virtual machines or containers 305 and 307, so that mobile devices 301 and 303 can receive transmitted or broadcasted application content from applications 306 and 308 with a minimum of latency. For example, virtual machines 305 and 307 may persistently run popular or in-demand versions of applications 306 and 308 with common configuration attributes, in order to meet expected demand for such applications 306 and 308 and configuration attributes from mobile devices 301 and 303. In further embodiments, certain triggers from mobile devices 301 or 303 (e.g., power on, obtaining network connectivity, successful authentication, etc.) may cause applications 306 and 308 to begin running on virtual machines or containers 305 and 307 in the expectation that the mobile devices 301 or 303 may request access to such applications 306 and 308 in the near future. In some embodiments, one or more triggers may be automatically communicated by an application container client or application manager executed on the mobile device, in response to a particular user interaction or without any specific user interaction.

FIG. 4 is an example illustration of mobile device user interfaces with graphical icons in accordance with disclosed embodiments. As illustrated, mobile device 401 may have a user interface 402, which may be a graphical user interface, textual interface, symbolic interface, or any other type (or combination) of mobile device user interface. User interface 402 may include a plurality of icons 403, corresponding to mobile applications running locally on mobile device 401. Icons 403 are selectable via user input, such as a touchscreen, writing or selection instrument, keypad, mouse, etc. When an icon 403 is selected, a mobile application may be executed on mobile device 401 using the native processing, memory, and graphics capabilities of mobile device 401.

Mobile device 404, on the other hand, includes a user interface 405 and two different sets of icons: icons 406, which correspond to natively stored and executed applications, and icons 407, which correspond to remotely executable applications. In particular, icons 407 may correspond to applications that are not stored on mobile device 404 or, even if they are stored on mobile device 404, they are not executed on mobile device 404. Instead, icons 407 correspond to mobile applications that may run on virtual machines or containers, as discussed above in connection with FIG. 1 (e.g., on server 106), FIG. 2 (e.g., virtual machines or containers 208), and FIG. 3 (e.g., virtual machines or containers 305 and 307). Thus, the icons 407 on mobile device 404 may be shortcuts or links to request access to a remotely running application. As discussed above, mobile device 404 may include a contained application manger (e.g., contained application manager 203 in FIG. 2), which has functions of authenticating mobile device 404 or a user thereof, and intermediating access to the remotely running mobile applications.

In some embodiments, icons 407 may be modified in their appearance to indicate that the corresponding applications will run securely, i.e., remotely on a virtual machine or container and not on the mobile device itself. For example, the contained application manager on the mobile device may create new icons 407, or may modify existing icons (e.g., by superimposing a symbol, tag, or badge), to indicate their secure nature. In further embodiments, even if mobile applications corresponding to icons 407 are stored on, and capable of running on, the mobile device 404, the contained application manager may create a link that redirects the mobile device to a remote server when the icon is selected. Thus, when the icon 407 is selected, rather than execute the application directly on the mobile device, the link will redirect the mobile device to request a connection with a remote server, as further discussed below.

Figure 5:
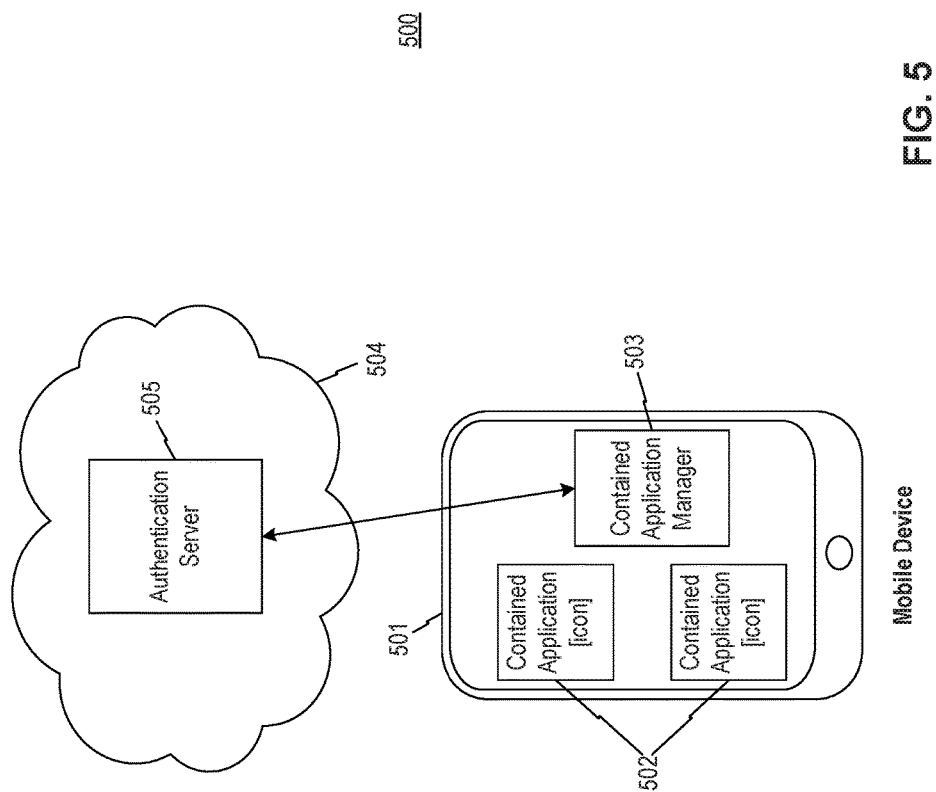
FIG. 5 is a block diagram of an example system, in accordance with disclosed embodiments.

FIG. 5 is a block diagram of an example system 500 in accordance with disclosed embodiments. As shown in FIG. 5, a mobile device 501 may contain a plurality of contained applications 502, which may have associated icons or other visual representations on a user interface of mobile device 501. Mobile device 501 may also have a contained application manager 503 which, as discussed above, can interface with a remote server to authenticate mobile device 501 or a user thereof, and obtain access to applications running on the remote server.

As shown in FIG. 5, contained application manager 503 may communicate with an authentication server 505 in network 504 in order to authenticate mobile device 501 or a user thereof. Based on whether the mobile device 501 or user is successfully authenticated or not, the mobile device 501 may or may not be allowed access to mobile applications running on a remote server (e.g., on virtual machines or containers, as described above). Server 505 may be a single server machine, a group of common server machines, or a server farm. In connection with the above discussion, server 505 may be separate from, or the same as, server 106 in FIG. 1, server 205 in FIG. 2, a server hosting virtual machines or containers 208 in FIG. 2, or a server hosting virtual machines or containers 305 and 307 in FIG. 3.

Authentication server 505 may be configured to authenticate mobile device 501 or a user thereof in various ways. For example, the authentication may involve verification of passwords, SSH keys, symmetric (e.g., public/private) keys, Kerberos tickets, Docker signed tags, or any other type of cryptographic data or privileged access tokens. As discussed above, the authentication may be based on biometric or behavioral information, such as fingerprints, retinal scans, x-rays, biosensors, voice recognition, body movements, walking pace or rhythm, sitting characteristics or patterns, key stroke analysis, and more. Further, the authentication may be single-factor or multi-factor (i.e., a combination of any of the foregoing forms of authentication). In alternative embodiments, the authentication may be performed on the mobile computing device, on a remote server, or through a combination of functionality of both. For example, if the authentication of the user occurs on the mobile device 501, the successful authentication may be communicated by mobile device 501 to authentication server 505, perhaps with an additional authentication of the mobile device 501 itself. Of course, the authentication can occur entirely on authentication server 505 itself, based on information received from mobile device 501 and/or other sources.

Figure 6:
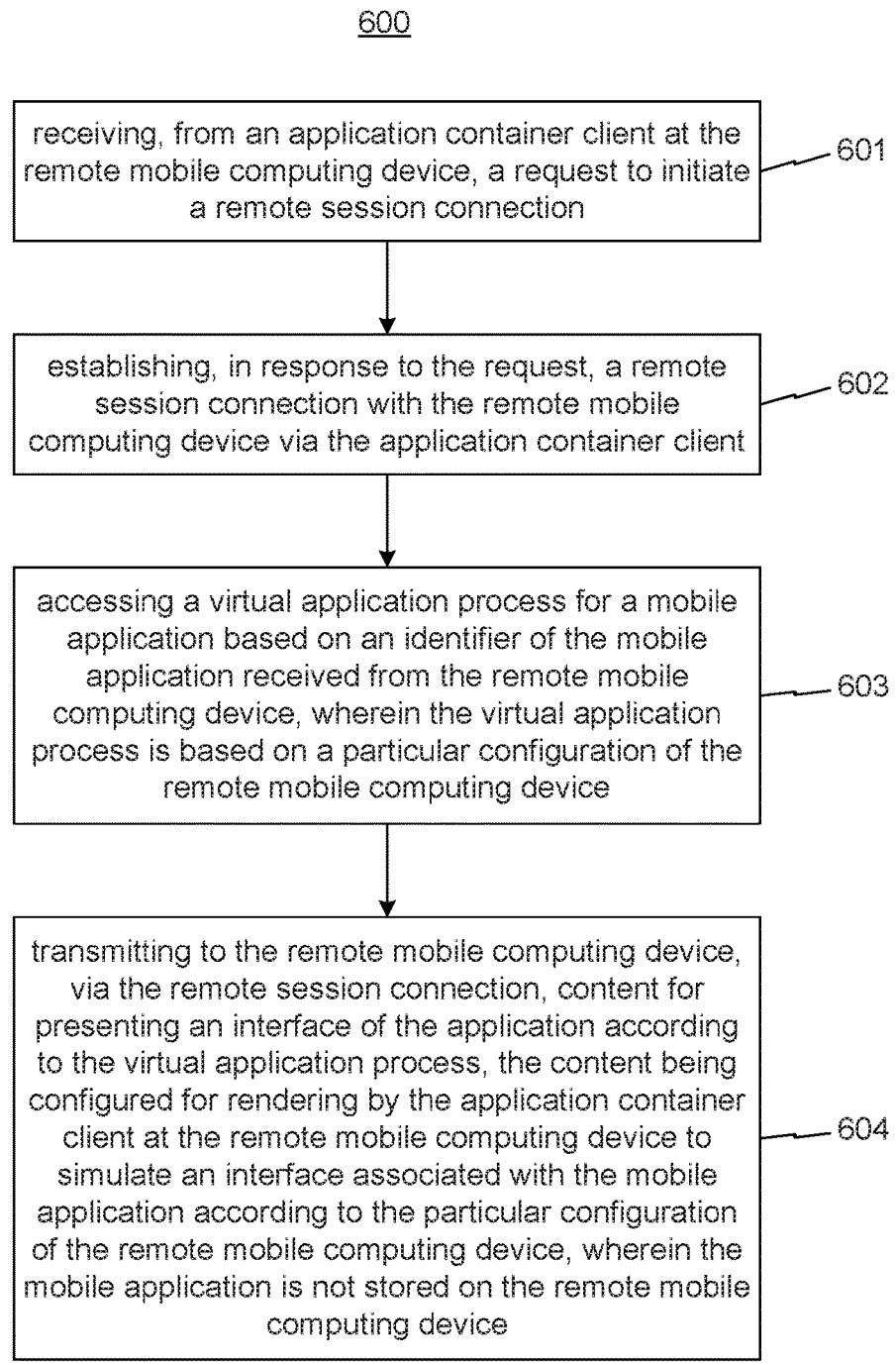
FIG. 6 is a flowchart depicting an example process for providing network-based application functionality to a remote mobile computing device, in accordance with disclosed embodiments.

FIG. 6 depicts an example process 600 for providing network-based application functionality to a mobile computing device, in accordance with various disclosed embodiments. Consistent with the disclosure above, process 600 may be performed in the system environments described in FIGS. 1-3 and 5.

Process 600 may involve an operation 601 of receiving, from an application container client at the remote mobile computing device, a request to initiate a remote session connection. For example, as discussed above the request may come from an application container client running on mobile devices 101-103 in FIG. 1, contained application manager 203 in FIG. 2, or contained application manager 503 in FIG. 5. The request may be a request for access to a mobile application running on a remote server, based on which the remote server decides to initiate a remote session connection. Alternatively, the request may itself explicitly request initiation of a remote session connection.

In some embodiments, the request includes an identification of the mobile application to be run. For example, in connection with FIG. 4, if an icon 407 is selected, the identification of a mobile application associated with that icon may be included in the request. Further, in some embodiments, the request may include configuration or specification information associated with the mobile device or user thereof. As discussed above, the configuration or specification information may be based on various mobile device or user attributes, such as an operating system type, operating system version, software or firmware upgrade status, screen resolution, network connection speed, theme, visual appearance, language, application settings, permissions, memory contents, other stored applications, personal information, email address, telephone number, IP address, MAC address, device identification number, etc. As discussed above, the configuration or specification information may include user-specific settings or other configuration parameters unique to a particular application, such as that effecting in-app interface or functionality. In alternative embodiments, the configuration or specification information is already stored at the remote server, and information in the request (e.g., a mobile device identifier) is used to access that configuration or specification information. In such embodiments, the configuration or specification information need not be transmitted in the request itself.

In some additional embodiments, the request may include authentication information associated with the mobile device or a user thereof. Alternatively, the authentication information may be transmitted from the mobile device separate from the request. As discussed above, the authentication may take various different forms. The authentication information provided by the mobile device may include data representing passwords, cryptographic keys, security tickets, signed tags, biometric information, or behavioral information.

The remote session connection may be a secure connection, such as a secure tunnel, that enables an application running at a remote server (or in a related virtual machine or container) to be broadcasted, streamed, or otherwise transmitted to the mobile device. The remote session connection may utilize a variety of remote connection technologies, such as "what-you-see-is-what-you-get" (WYSIWYG) streaming, textual representations of GUI components, Microsoft's Remote Desktop™ VNC™, or proprietary remote streaming or transmission protocols. In some embodiments, where the mobile device sends authentication information, or configuration or specification information, to the remote server, that information may be sent via the remote session connection. In additional embodiments, the mobile device may send the authentication information to the remote server and, conditional on the successful authentication of the mobile device or user, the remote session connection may be established.

Process 600 may also include an operation 602 of establishing, in response to the request, a remote session connection with the remote mobile computing device. The remote session connection may be established via the application container client running on mobile devices 101-103 in FIG. 1, contained application manager 203 in FIG. 2, or contained application manager 503 in FIG. 5. As discussed above, the remote session connection may be established conditional on the successful authentication of the mobile device or a user thereof. Alternatively, the remote session connection may be established initially between the mobile device and remote server, so that authentication information from the mobile device can be transmitted to the remote server through the remote session connection. Further, as discussed above, configuration or specification information may be sent from the mobile device to the remote server via the remote session connection. Alternatively, such configuration or specification information may be accessed from storage associated with the remote server. In various embodiments, the remote session connection may be between the mobile device and an authentication server, an application virtualization server, or a server hosting virtual machines or containers, or any server performing a combination of the functions of such servers.

Process 600 may also include an operation 603 of accessing a virtual application process for a mobile application based on an identifier of the mobile application received from the remote mobile computing device. The virtual application process may also be based on a particular configuration of the remote mobile computing device. In some embodiments, the virtual application process may also be based on particular user-specific settings, such as those uniquely associated with a user's account with the application for effecting in-app interfaces and functionality, for example. In different embodiments, operation 603 may occur with or without authentication of the mobile device or a user thereof. If authentication of the mobile device or user is performed, the step of accessing the virtual application process may be performed conditional on a successful authentication.

As discussed above, the virtual application process may be a mobile application running on a virtual machine or container, such as on server 106 of FIG. 1, machines 208 of FIG. 2, machines 305 or 307 of FIG. 3, server 505 of FIG. 5. In some embodiments, the virtual application process is identified based on an identifier of the corresponding mobile application received from the mobile device. For example, as part of the mobile device's request to initiate a remote session connection, or separate from that request, the mobile device may transmit to the remote server an identifier of the mobile application to which it is requesting access. In the example of FIG. 4, for instance, if a user selects an icon 407, the identifier may specify a mobile application corresponding to that selected icon. The identifier may come from the selected mobile application or shortcut itself, or may be generated by a contained application manager (e.g., contained application manager 203 in FIG. 2, or contained application manager 503 in FIG. 5).

Consistent with the above discussion, accessing a virtual application process may involve spinning up a new virtual machine or container to run a mobile application, executing the mobile application on an already-spun up virtual machine or container, or identifying an already-spun up and already-executing version of the mobile application on a virtual machine or container. Regardless of how the virtual application process is accessed, it may be based on a particular configuration or specification of the mobile device such that the virtual application process corresponds to a native application as it would be similarly executed on the mobile device. For example, as discussed above in connection with FIG. 3, mobile devices 301 and 303 may have numerous types of associated configuration or specification information 302 and 304. This information may be transmitted to virtual machines or containers 305 and 307. Based on this information, mobile applications 306 and 308 may be run by the virtual machines or containers 305 and 307 to closely resemble how the application would run if it were natively being executed on the corresponding mobile device.

In this way, the specific settings and attributes of the mobile device (e.g., operating system, language, software updates, etc.) that may affect how applications are run and displayed on the mobile device may be applied to ensure that the application runs with the same look and feel on the virtual machine or container.

Process 600 may also include an operation 604 of transmitting to the remote mobile computing device, via the remote session connection, content for presenting an interface of the application according to the virtual application process. The content may be configured for rendering by the application container client at the remote mobile computing device to simulate an interface associated with the mobile application according to the particular configuration of the remote mobile computing device. In some embodiments, the mobile application is not stored on the remote mobile computing device. Consistent with the above discussion, in embodiments that require the mobile device or a user thereof to authenticate itself (e.g., to authentication server 505 in FIG. 5), the content maybe transmitted to the mobile device conditional on a successful authentication.

The content may be transmitted to the mobile device in several ways and formats. Depending on the content (e.g., pure video, multimedia, HTML pages, etc.), the content may be streamed to the mobile device as video. For example, WYSIWYG streaming may be used for such an application. For content that involves user-selectable features, textual representations of GUI components may be transmitted to the mobile device (along with GUI placement and function information), which the mobile device can then use to generate a rendering of the content.

In further embodiments, the content may be transmitted via various types of lightweight textual representation protocols. These protocols may, for example, involve compressing data (e.g., textual or graphical content) and may use delta differentiating techniques, which involve only sending differential (i.e., changed) data to the mobile device, rather than all data continuously. In this way, a relatively static (unchanging) mobile application, or a mobile application with many common and repeated elements, will require significantly less data to be sent to the mobile device compared to fully streaming the mobile application to the mobile device. In some embodiments, caching content data on the mobile device may further improve the performance on the mobile device, since common or repeated content elements (especially relatively large graphics or multimedia elements) can be recalled from the mobile device's memory rather than repeatedly transmitted to the mobile device.

To facilitate the process of sending lightweight content data to the mobile device, the virtualization server may use a GUI extractor to identify post-rendered GUI components of an executing mobile application. The GUI extractor may store the extracted GUI components in a representation file (e.g., based on JSON or XML), which may also include external styling files, code GUI manipulations, etc.). The GUI extractor may also store byte arrays representing non-native graphical components (e.g., images or other complicated objects) from the execution of the mobile application. The representation file and byte arrays may then be sent to the mobile device. The mobile device can parse (e.g., using a contained application manager) the received information and recreate the content to be rendered on the mobile device (i.e., the application as it was executed on the virtualization server). Because the mobile application was executed at the virtualization server based on the particular configuration or specification of the mobile device, the content should be able to be rendered on the mobile device without any configuration conflicts or bugs and should be able to be rendered to provide an interface similar to as it would appear for a native application running on the device according to a user's particular configuration.

In further embodiments, the content may be transmitted to the mobile device using other remote control or broadcast protocols. One example is RealVNC™ which works like a pure stream of content, and broadcasts everything that may be seen from the actual execution of the mobile application. This technique involves emulating mouse clicks, screen taps, and other user input. The streamed content may be compressed in order to reduce data transmission to mobile device. RealVNC™ may be used in the Android™ operating system, for example, using the Droid VNC Server app, Nomachine app, Webkey app, or VMLite VNC Server app. Further, as an alternative to RealVNC™, Microsoft's Remote Desktop Protocol™ (RDP) can be used for remotely streaming content to a mobile device. RDP allows for streaming of textual representations of GUI components, and then rendering or drawing them on the mobile device (e.g., using a contained application manager).

In some embodiments, the content may include (or a separate message to the mobile device may include) instructions for the mobile device to access its local memory or other resources (e.g., other applications, sensors, actuators, cameras, microphones, or other locally available hardware, software, or data). For example, if the content being received at the mobile device is for rendering the application Facebook™ on the mobile device, instructions in the content (or in a separate message) may instruct the mobile device to access local photos, contacts, or other information, for use with the mobile Facebook™ application being rendered. Locally accessed photos, contacts, or other information may then be integrated directly into the rendered content on the mobile device, or transmitted to the remote server for integration into the executing mobile application there. Further, even without an instruction to access local memory or other resources on the mobile device, in some embodiments the user of the mobile device may choose to access such local memory or other resources. In that situation, the mobile device may send an appropriate command (e.g., from the contained application manager) to the remote server running the virtualized mobile application, confirming that such memory or other resources are being accessed. Accordingly, even though the application itself (e.g., Facebook™) is running remotely from the mobile device, the user of the mobile device is able to interact with the application and the local resources on their mobile device as though the application was running natively on the mobile device. In some embodiments, instructions from the remote server for the mobile device to access its local storage or other resources, or instructions from the mobile device confirming that the user has accessed such resources, may be communicated between the mobile device and remote server via a separate, auxiliary remote connection. In other embodiments, the same remote connection that was initially established between the mobile device and remote server may be used.

In operation 604, regardless of which of the above techniques is used to transmit the content to the mobile device, the mobile device is configured to render the content and thereby simulate an interface associated with the mobile application that is executing at a remote server (e.g., on a virtual machine or container) on behalf of the mobile device. As discussed above, because the particular configuration or specific settings of the mobile device have been provided to the remote server, and the mobile application is executing in accordance with those configurations or specifications, when the mobile device renders the content it is able to do so without conflicts among configurations or specifications. In this way, the mobile application is rendered at the mobile device with the same look and feel as if the application was running natively on the mobile device. This enables a user to interact with the mobile application transparently to the fact that the application is actually executing remotely and interacting with other third party servers on its behalf.

In some embodiments, by virtue of its position as an intermediary between a mobile device and a virtual application process, a remote server (e.g., server 205 in FIG. 2) may be configured to control and or monitor a user's interaction with a mobile application executed via a virtual application process. The disclosed embodiments, therefore, may support recording or auditing by an enterprise or cloud system provider of user interaction via one or more mobile applications. In the disclosed embodiments, when a mobile device establishes a connection with a remote server, the enterprise or cloud system provider can monitor, record, and audit (e.g., in the form of keystrokes, screenshots, connection logs, file transfer logs, etc.) the activity of the mobile device when participating in the remote session connection with a virtual application process. In some embodiments, an enterprise or cloud system provider may even control or restrict select functionality of the virtual application process by blocking or prohibiting certain interactions with the virtual application process or blocking or prohibiting certain communications from the virtual application process being transmitted to the mobile device.

Figure 7:
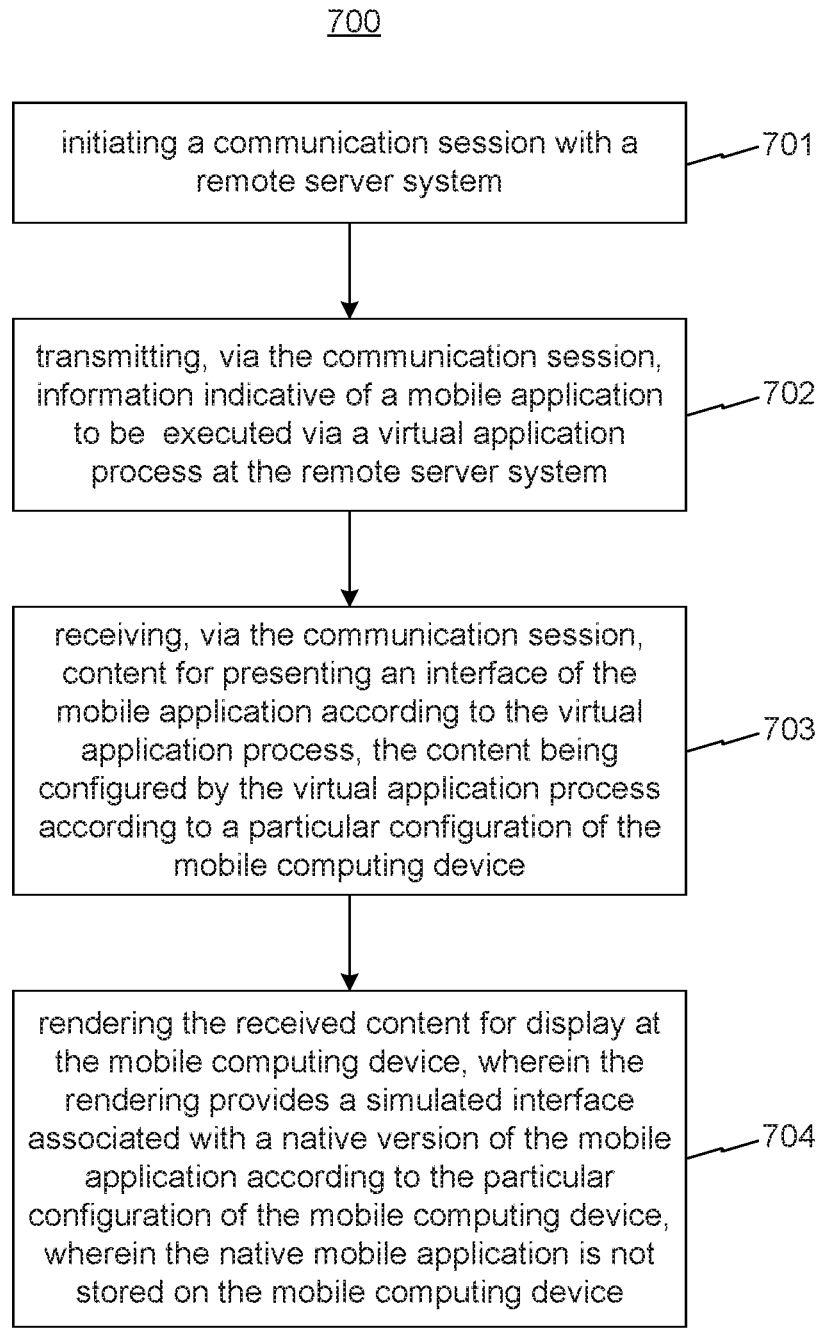
FIG. 7 is a flowchart depicting another example process for providing network-based application functionality to a remote mobile computing device, in accordance with disclosed embodiments.

FIG. 7 depicts an exemplary process 700 for providing network-based application functionality to a mobile computing device. Consistent with the disclosure above, process 700 may be performed in the system environments described in FIGS. 1-3 and 5.

As part of process 700, a mobile device may perform an operation 701 of initiating a communication session with a remote server system. Similar to the above discussion of operation 601 in FIG. 6, this may involve, or be separate from, requesting a remote session connection with a remote server, such as an authentication server, virtualization server, virtual machine, or container. The communication session may be secured (e.g., via SSL, TLS, SRTP, etc.), as discussed above. Moreover, as discussed above, the communication session may be initiated by the mobile device or the remote server. In some embodiments, the initial communications between the mobile device and remote server may serve to authenticate the mobile device or a user thereof, provide an identifier of a mobile application to the remove server, and/or provide configuration or specification information to the remote server.

Process 700 may also include an operation 702 of transmitting, via the communication session, information indicative of a mobile application to be executed via a virtual application process at the remote server system. For example, as described above, the information indicative of a mobile application may be an identifier of a mobile application (or shortcut) selected by a user of a mobile device. Further, the information indicative of a mobile application may be a link that the mobile device uses to re-route the user's selection of a mobile application (or shortcut) to the remote server. Once received by a remote server (e.g., server 106 of FIG. 1, server 205 of FIG. 2, machines 208 of FIG. 2, machines 305 or 307 of FIG. 3, or server 505 of FIG. 5), the corresponding mobile application may be executed on a virtual machine or container. Consistent with the above discussion, the mobile application may be executed on a newly spun up virtual machine or container, executed on an already spun up virtual machine or container, or already executing on a virtual machine or container. The mobile application may be executed in accordance with particular configuration or specification information of the mobile device, as discussed above.

Process 700 may also include an operation 703 of receiving, via the communication session, content for presenting an interface of the mobile application according to the virtual application process. The content may be configured by the virtual application process according to a particular configuration of the mobile computing device. As described above, the content may come in several different forms and may be rendered in several different ways. Examples include the lightweight textual representation protocols discussed above, RealVNC™, and Microsoft's Remote Desktop Protocol™ (RDP). Further, the content is based on the execution of the mobile application at a remote server in accordance with the configuration or specification settings of the mobile device. Because the mobile application has been executed remotely (e.g., on a virtual machine or container) in accordance with the configuration or specification settings of the mobile device, any potential conflicts between different configuration or specification settings (e.g., between the emulator or simulator running the application on the remote server and the mobile device itself) are avoided.

Process 700 may also include an operation 704 of rendering the received content for display at the mobile computing device. The rendering may provide a simulated interface associated with a native version of the mobile application according to the particular configuration of the mobile computing device. In some embodiments, the native mobile application is not stored on the mobile computing device. For example, once the content is received at the mobile device, the mobile device may (e.g., using a contained application manager on the mobile device) render the content to simulate the execution of the mobile application on the mobile device. While the mobile application is running remotely at a remote server (e.g., via a virtual machine or container), the rendering of the application at the mobile device simulates the look and feel of the application, as if it were running on the mobile device itself. As discussed above, any configuration of specification settings of the mobile device may have been communicated to (or known by) the remote server, and the remote execution of the application thus closely resembles how the mobile device itself would execute the application.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization processes, rendering protocols, communication networks, and applications will be developed and the scope of the these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A server system for providing network-based application functionality to a remote mobile computing device, the system comprising:
   a memory device storing a set of instructions; and
   a processor configured to utilize an auxiliary communication channel to allow an application container client at the remote mobile computing device to transmit data representative of a local resource on the remote mobile computing device, wherein the processor is further configured to execute the set of instructions to:
      receive, from the application container client at the remote mobile computing device, a request to initiate a remote session connection;
      establish, in response to the request, a remote session connection with the remote mobile computing device via the application container client;
      determine a particular user-specific configuration of the remote mobile computing device based on user-specific specification information associated with the remote mobile computing device, wherein the user-specific specification information includes user-specific information indicative of at least one of: a user-specific setting of the remote mobile computing device, a user-specific operational-specific setting of the remote mobile computing device, and one or more user-specific parameters affecting visual display characteristics of the remote mobile computing device;
      access a virtual application process for a mobile application running on a remote server that is external to the remote mobile computing device, based on an identifier of the mobile application received from the remote mobile computing device, wherein the virtual application process is based on the particular user-specific configuration of the remote mobile computing device; and
      transmit to the remote mobile computing device, via the remote session connection, content for presenting an interface of the mobile application according to the virtual application process, the content being configured for rendering by the application container client at the remote mobile computing device to simulate an interface associated with the mobile application according to the particular user-specific configuration of the remote mobile computing device.

2. The system of claim 1, wherein the user-specific specification information includes information indicative of one or more settings of an operating system associated with the remote mobile computing device.

3. The system of claim 1, wherein the user-specific operational-specific setting of the remote mobile computing device includes at least one of: a screen resolution of the remote mobile computing device and a language setting for the remote mobile computing device.

4. The system of claim 1, wherein the processor is configured to retrieve the user-specific specification information from storage distinct from the remote mobile computing device.

5. The system of claim 1, wherein the virtual application process for the mobile application is based on at least one user-specific setting associated with a user's account with the mobile application.

6. The system of claim 1, wherein the received request to initiate the remote session connection includes the user-specific specification information.

7. The system of claim 1, wherein the received request to initiate the remote session connection includes a credential for authenticating a user associated with the remote mobile computing device.

8. The system of claim 7, wherein the remote session connection is established responsive to authenticating the request based on the credential.

9. The system of claim 1, wherein the received request to initiate the remote session connection includes the identifier of the mobile application.

10. The system of claim 9, wherein the received request to initiate the remote session connection is received via the application container client responsive to a user selection of an icon associated with the mobile application.

11. The system of claim 1, wherein the mobile application is one of a plurality of third-party applications accessible via the application container client.

12. The system of claim 1, wherein the content is configured for rendering by the application container client at the remote mobile computing device to simulate an interface associated with a native version of the mobile application as if the native mobile application were executed on the mobile computing device.

13. The system of claim 1, wherein to access the virtual application process, the processor is further configured to launch the virtual application process.

14. The system of claim 1, wherein to access the virtual application process, the processor is further configured to identify a virtual application process, based on the particular user-specific configuration of the remote mobile computing device, from among a plurality of active virtual application processes launched prior to receiving the request from the remote mobile computing device.

15. The system of claim 1, wherein the processor is further configured to control the virtual application process for the mobile application on behalf of the remote mobile computing device.

16. The system of claim 1, wherein the processor is further configured to log a user's interaction with the mobile application via the virtual application process.

17. The system of claim 1, wherein the processor is further configured to monitor the remote session connection for actions pertaining to the virtual application process initiated at the remote mobile computing device.

18. The system of claim 1, wherein the processor is further configured to receive the data representative of a local resource stored on the remote mobile computing device.

19. A method for providing network-based application functionality to a remote mobile computing device, the method comprising:

receiving, from an application container client at the remote mobile computing device, a request to initiate a remote session connection;

establishing, in response to the request, a remote session connection with the remote mobile computing device via the application container client, wherein the remote session connection is established via an auxiliary communication channel to allow the application container client at the remote mobile computing device to transmit data representative of a local resource on the remote mobile computing device;

determining a particular user-specific configuration of the remote mobile computing device based on user-specific specification information associated with the remote mobile computing device, wherein the user-specific specification information includes information indicative of at least one of: a user-specific setting of the remote mobile computing device, a user-specific operational-specific setting of the remote mobile computing device, and one or more user-specific parameters affecting visual display characteristics of the remote mobile computing device;

accessing a virtual application process for a mobile application running on a remote server that is external to the remote mobile computing device, based on an identifier of the mobile application received from the remote mobile computing device, wherein the virtual application process is based on the particular user-specific configuration of the remote mobile computing device; and transmitting to the remote mobile computing device, via the remote session connection, content for presenting an interface of the mobile application according to the virtual application process, the content being configured for rendering by the application container client at the remote mobile computing device to simulate an interface associated with the mobile application according to the particular user-specific configuration of the remote mobile computing device.

20. The method of claim 19, wherein the user-specific operational-specific setting of the remote mobile computing device includes at least one of: a screen resolution of the remote mobile computing device and a language setting for the remote mobile computing device.

21. The method of claim 19, wherein the content is configured for rendering by the application container client at the remote mobile computing device to simulate an interface associated with a native version of the mobile application as if the native mobile application were executed on the mobile computing device.

22. A non-transitory computer readable medium including a set of instructions executable by a processor of a mobile computing device to perform operations for providing network-based mobile application functionality at the mobile computing device, the operations comprising:

initiating a communication session with a remote server system via an auxiliary communication channel to allow an application container client at the mobile computing device to transmit data representative of a local resource on the mobile computing device;

transmitting, via the communication session, information indicative of a mobile application to be executed via a virtual application process at the remote server system, wherein the remote server system is external to the mobile computing device;

receiving, via the communication session, content for presenting an interface of the mobile application according to the virtual application process, the content being configured by the virtual application process according to a particular user-specific configuration of the mobile computing device, wherein the particular user-specific configuration of the mobile computing device is based on user-specific specification information associated with the mobile computing device and wherein the user-specific specification information includes information indicative of at least one of: the user-specific setting of the mobile computing device, a user-specific operational-specific setting of the mobile computing device, and one or more user-specific parameters affecting visual display characteristics of the mobile computing device; and rendering the received content for display at the mobile computing device, wherein the rendering provides a simulated interface associated with a native version of the mobile application according to the particular user-specific configuration of the mobile computing device.

23. The non-transitory computer readable medium of claim 22, the operations further comprising providing user-specific specification information indicative of the particular user-specific configuration of the mobile computing device.

24. The non-transitory computer readable medium of claim 22, wherein the transmitting information indicative of the mobile application is provided as part of a request to initiate the communication session with the remote server system.

25. The non-transitory computer readable medium of claim 22, wherein the initiating of the communication session with the remote server system is performed responsive to receiving a user selection of an icon associated with the mobile application.

26. The non-transitory computer readable medium of claim 25, wherein the mobile application is one of a plurality of third-party applications accessible via the application container client.

27. The non-transitory computer readable medium of claim 26, wherein the simulated interface is based on at least one user-specific setting associated with a user's account with the mobile application.

* * * * *